United States Patent
Guha et al.

(10) Patent No.: US 8,339,581 B2
(45) Date of Patent: Dec. 25, 2012

(54) SYSTEMS AND METHODS FOR QUANTUM RECEIVERS FOR TARGET DETECTION USING A QUANTUM OPTICAL RADAR

(75) Inventors: Saikat Guha, Everett, MA (US);
Zachary Dutton, Cambridge, MA (US)

(73) Assignee: Raytheon BBN Technologies Corp., Cambridge, MA (US)

(*) Notice: Subject to any disclaimer, the term of this patent is extended or adjusted under 35 U.S.C. 154(b) by 574 days.

(21) Appl. No.: 12/610,739

(22) Filed: Nov. 2, 2009

(65) Prior Publication Data

US 2010/0177297 A1   Jul. 15, 2010

Related U.S. Application Data

(60) Provisional application No. 61/144,003, filed on Jan. 12, 2009.

(51) Int. Cl.
*G01C 3/08*   (2006.01)
(52) U.S. Cl. ......... 356/4.01; 356/3.01; 356/4.1; 356/5.1
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

| | | | | |
|---|---|---|---|---|
| 6,897,434 B1* | 5/2005 | Kumar et al. | ............ | 250/227.18 |
| 2009/0290162 A1* | 11/2009 | Erkmen et al. | ................ | 356/450 |

OTHER PUBLICATIONS

Avenhaus, M., et al., "Experimental verification of high spectral entanglement for pulsed waveguided spontaneous parametric down-conversion," Physical Review A 79, pp. 043836-1-043836-5 (2009).
Eckstein, A., et al, "Broadband frequency mode entanglement in waveguided parametric donwconversion," Opticla Letters, vol. 33, No. 16, pp. 1825-1827, Aug. 15, 2008.
Li, X., et al, "All-fiber source of frequency-entabled photon pairs," Physical Review A 79, 033817 pp. 033817-1-033817-9 (2009).
Shimizu, R., et al., "High-flux and broadband biphoton sources with controlled frequency entanglement," Optics Express, vol. 17, No. 19, pp. 16385-16393, Sep. 14, 2009.
Guha. "Receiver design to harness quantum illumination advantage." Proc. of the IEEE Int'l. Symp. on Information Theory (ISIT 2009). (Jun. 28, 2009-Jul. 3, 2009).
Guha et al. "Gaussian-state quantum-illumination receivers for target detection." Physical Review Letters (Oct. 8, 2009).

* cited by examiner

*Primary Examiner* — Luke Ratcliffe
(74) *Attorney, Agent, or Firm* — Ropes & Gray LLP

(57) ABSTRACT

A quantum-illumination receiver is described comprising a phase-conjugation and mixing system for mixing and/or conjugating the idler beam from an entangled light transmitter and the return beam from the target to produce an output beam that is representative of the presence or absence of the target, a light beam collector for receiving a return light beam from the target region and directing the return light beam from a target region to the phase-conjugation and mixing system input, an optical input for receiving an idler light beam from a transmitter and directing the idler light beam from the transmitter to the phase-conjugation and mixing system, a sensor for measuring the output of the phase-conjugation and mixing system, and a processor to process the output of the sensor to make an determination about the presence of the target.

18 Claims, 9 Drawing Sheets

SYSTEMS AND METHODS FOR QUANTUM RECEIVERS FOR TARGET DETECTION USING A QUANTUM OPTICAL RADAR

CROSS-REFERENCE TO RELATED APPLICATIONS

This application claims priority to U.S. Provisional Patent Application No. 61/144,003, filed Jan. 12, 2009, the contents of which are incorporated herein by reference in their entirety.

GOVERNMENT CONTRACTS

The U.S. Government has a paid-up license in this invention and the right in limited circumstances to require the patent owner to license others on reasonable terms as provided for by the terms of Contract No. FA8750-07-C-0206, awarded by the Defense Advanced Research Projects Agency.

BACKGROUND OF THE INVENTION

1. Field of the Invention

The invention relates to the field of receivers for target detection, imaging, and range estimation. More particularly, this invention relates to the field of optical receivers for target detection, imaging, and range estimation.

2. Background Information

Optical or optoelectrical systems have long been used in various sensing applications, including but not limited to target detection, imaging, and range estimation. Target detection systems include a transmitter for interrogating or illuminating a target region, and a receiver for detecting a return signal representative of the presence or absence of an object in the target region.

Some target detection systems employ coherent-light laser beams in the transmitter, the receiver, or in both the transmitter and receiver. These systems are collectively referred to as Laser Radar or Laser Detection and Ranging (LADAR) systems. In the simplest LADAR target detection system, for example, the presence of a target is detected by the transmitter shining a laser beam towards the target region, and the receiver determining whether any of the transmitted laser light is reflected back. However, this determination is not easily done in real world systems. For targets located far away from the transmitter, only a small fraction of the transmitted light is reflected back from the target region to the receiver. In addition, if the target region contains other light sources or thermal radiation (collectively referred to as "noise" sources), it may be very difficult to distinguish the component of the return signal containing light reflected off the target from that contributed by noise, because the return signal-to-noise ratio of the return light beam is very low.

Conventional LADAR systems use lasers to interrogate targets. Laser beams are created by stimulating the emission of light "photons" from atoms. As these atoms lose energy, they emit photons, which are collected and transmitted as a laser beam. Coherent laser beams include photons which have a fixed phase relationship with one another. The phase relationship may be temporal, spatial, or spatio-temporal.

A different kind of state of light, called quantum-mechanically entangled light, can be created by nonlinear crystals which are pumped by lasers. Quantum entanglement refers to the phenomenon that the quantum mechanical state of one photon in the pair is correlated with the quantum mechanical state of the other photon in the pair in a way that is stronger than any classical system. For instance, if the polarization state of one of the photons is known, then the polarization state of the other photon is known. Or perhaps, if the frequency or wavelength of one photon is known, then the frequency or wavelength of the other photon is known, too.

Recent research into a method called "quantum-illumination" predicts that with the use of quantum-mechanically entangled light to interrogate or illuminate distant objects, significant enhancements may be achieved over the use of unentangled/coherent light for detecting those objects. However, no known detection system exists for realizing these theoretical predictions of enhancement. Therefore, there is a need for practically realizable joint-detection optical receiver that realizes significant quantum-illumination enhancements in target detection, imaging and range estimation systems.

SUMMARY OF THE INVENTION

The systems and methods described herein in various embodiments provide for quantum illumination receivers that exploit entangled light transmitters to allow for improved target detection, imaging and range estimation performance, even under low signal-to-noise ratio operating conditions.

In one aspect, the invention relates to a quantum-illumination receiver for interrogating a target region. The receiver includes a phase-conjugation and mixing system for outputting an output beam representative of the contents of the target region. It also includes a beam collector for receiving a return beam from the target region and directing the return beam to the phase-conjugation and mixing system. The receiver further includes an optical input for receiving an idler beam from a transmitter and for directing the idler beam, which is originally entangled with the signal beam interrogating the target region, from the transmitter to the phase-conjugation and mixing system. The receiver includes a sensor for measuring the output of the phase-conjugation and mixing system. The receiver may be in communication with a processor configured to process the output of the sensor to detect the presence or absence of a target in the target region.

In some embodiments, the phase-conjugation and mixing system includes an optical parametric amplifier (OPA). The phase-conjugation and mixing system also includes a laser pump for directing a laser beam into the OPA to amplify the received return and idler beams.

In certain embodiments, the phase-conjugation and mixing system includes a nonlinear crystal that is constructed from a material selected from the group comprising lithium niobate, lithium tantalate, potassium niobate, potassium titanyl phosphate, potassium dihydrogen phosphate, potassium dideuterium phosphate, lithium triborate, cesium lithium borate, cesium borate, yttrium calcium oxyborate, strontium beryllium borate, zinc germanium diphosphide, silver gallium sulfide, silver gallium selenide, cadmium selenide, silicon dioxide, and gallium arsenide.

In some embodiments, the sensor includes a photon counter. In certain embodiments, the photon counter is a single-photon detector. Optionally, the single-photon detector is used for a large number of detected modes. In some embodiments, the number of detected modes may be greater than 1,000,000.

In some embodiments, the receiver includes a processor (e.g. a classical post-processor) configured to process the output of the detector to make a determination about the presence of a target in the target region with reduced probability of error. In some embodiments, the processor is configured to control a delay of the received idler beam based on an estimated distance to the target region. This delay is provided by a delay circuit. In this embodiment, the receiver may also include a user interface for estimating or selecting the distance to the target region.

In another aspect, the invention relates to a method for interrogating a target region. The method includes the steps of receiving a return beam from the target region and directing the received return beam to a phase-conjugation and mixing system and receiving an idler beam from a transmitter and directing the received idler beam to the phase-conjugation and mixing system. The idler beam is quantum-mechanically entangled with a signal beam interrogating the target region. The method further includes measuring an output of the phase-conjugation and mixing system using a sensor, the phase-conjugation and mixing system output being representative of the contents of the target region. The output of the sensor is processed to detect the presence of a target in the target region.

In some embodiments, the method further includes the step of amplifying the received return and idler beams by directing a laser beam from a laser pump into the phase-conjugation and mixing system. The laser beam is included in the phase-conjugation and mixing system.

In this application, a phase-conjugation and mixing system refers to any logical combination of one or more components, including but not limited to an optical parametric amplifier (OPA), a laser pump, a beam collector, a 50-50 beam splitter, a unity-gain differential amplifier, and an optical input.

Optionally, the method may include the step of controlling a delay of the received idler beam based on a distance to the target region. In some embodiments, the method further includes receiving a user input for estimating the distance to the target region.

In this application, embodiments will be described in reference to a quantum-illumination receiver, which includes an optical parametric amplifier and a photon counter. The photon counter may be a single-photon detector. It is to be understood that the systems and methods discussed herein are applicable to any optical, electrical, or opto-electrical system including, but not limited to, optical target-detection, sensing, and imaging systems.

BRIEF DESCRIPTION OF THE DRAWINGS

The invention description below refers to the accompanying drawings, of which.

DESCRIPTION OF CERTAIN ILLUSTRATIVE EMBODIMENTS

To provide an overall understanding of the invention, certain illustrative embodiments will now be described. However, it will be understood by one of ordinary skill in the art that the methods described herein may be adapted and modified as is appropriate for the application being addressed and that the systems and methods described herein may be employed in other suitable applications, and that such other additions and modifications will not depart from the scope hereof.

Recent research published in Science, Vol 321, Pages 1463-5, titled "Enhanced Sensitivity of Photodetection via Quantum Illumination," and in Physical Review Letters 101, 253601 (2008), titled "Quantum Illumination with Gaussian States," the contents of each of which are hereby incorporated herein in their entirety, suggests that with the use of quantum-mechanically entangled light to interrogate or illuminate distant objects, significant enhancements may be achieved over the user of unentangled/coherent light for detecting and/or imaging the objects. These enhancements are particularly significant in low signal-to-noise ratio settings.

The illustrative embodiments described in reference to FIGS. 1A-5, include a quantum illumination receiver that in conjunction with an entangled light transmitter allows for improved target detection, even under low signal-to-noise ratio conditions.

Figure 1A:
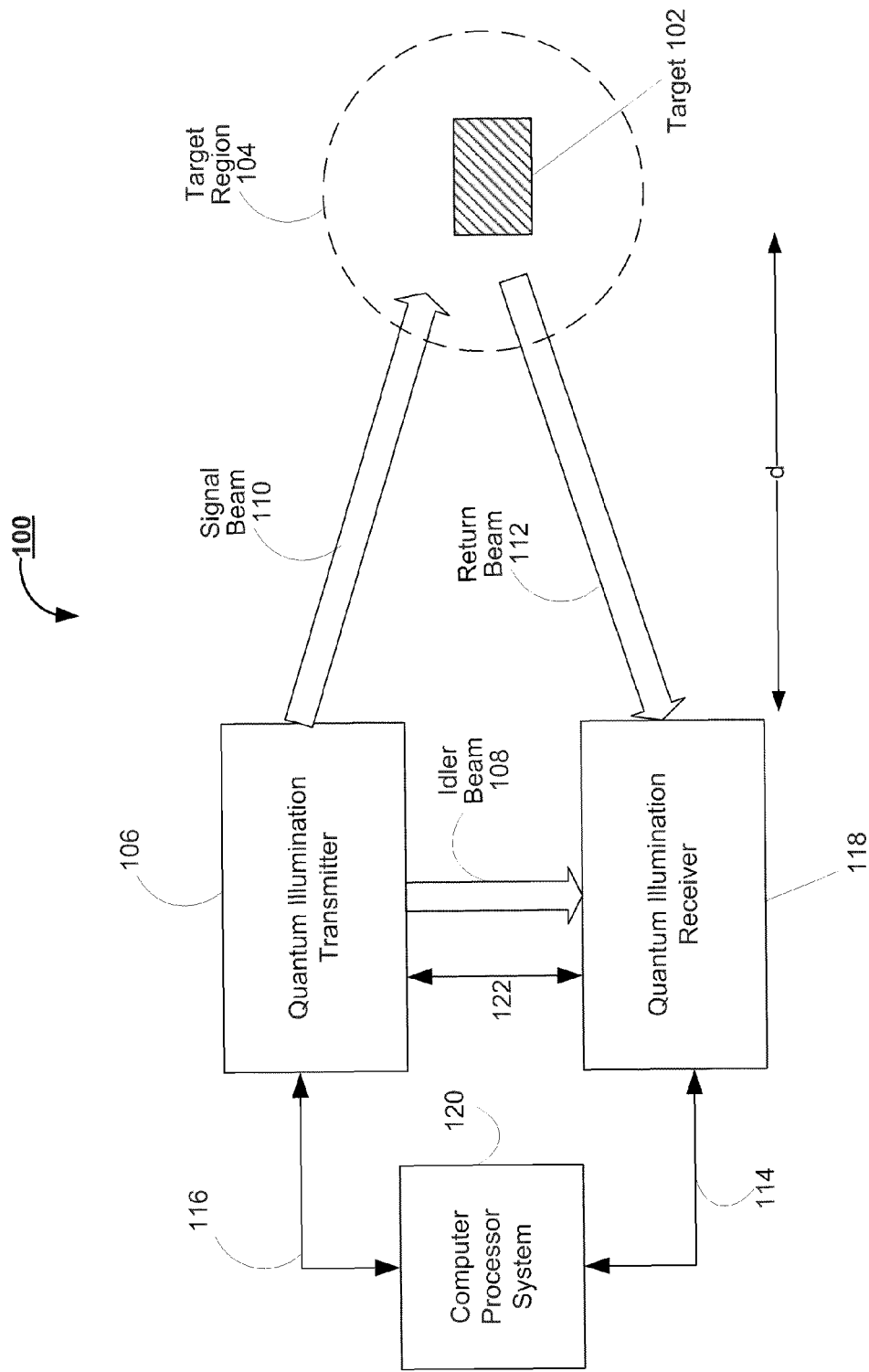
FIG. 1A is a block diagram of a laser-based target detection system, according to an illustrative embodiment.

FIG. 1A is a block diagram of an optical target detection system 100, according to an illustrative embodiment. System 100 includes a quantum-illumination transmitter 106 and a quantum-illumination receiver 118. In addition, system 100 includes a computer processor system 120 that is in communication with both transmitter 106 (via link 116) and receiver 118 (via link 114). There may also be an electrical or optical link 122 between the receiver 118 and the transmitter 106.

In operation, system 100 detects the presence or absence of a target 102 in a target region 104 by the transmitter 106 creating and emitting a signal beam 110 towards target region 104 an idler beam 108 that is entangled with the signal beam, to receiver 118. Receiver 118 then determines the presence of target 102 by processing the received return beam 112 and the retained idler beam 108. In system 100, it is assumed that the target 102 is at a distance d from the receiver 118 and/or transmitter 106. In some embodiments, the idler beam 108 may have to be synchronized with the return beam 112 based on an estimate of the distance d as described in relation to FIG. 1C or 1D.

The components of transmitter 106, receiver 118, and computer processor system 120 will be described in detail in relation to FIGS. 1B, 1C, 1D, and 1E, respectively. In the following descriptions, references will also be made to components in FIG. 1A.

Figure 1B:
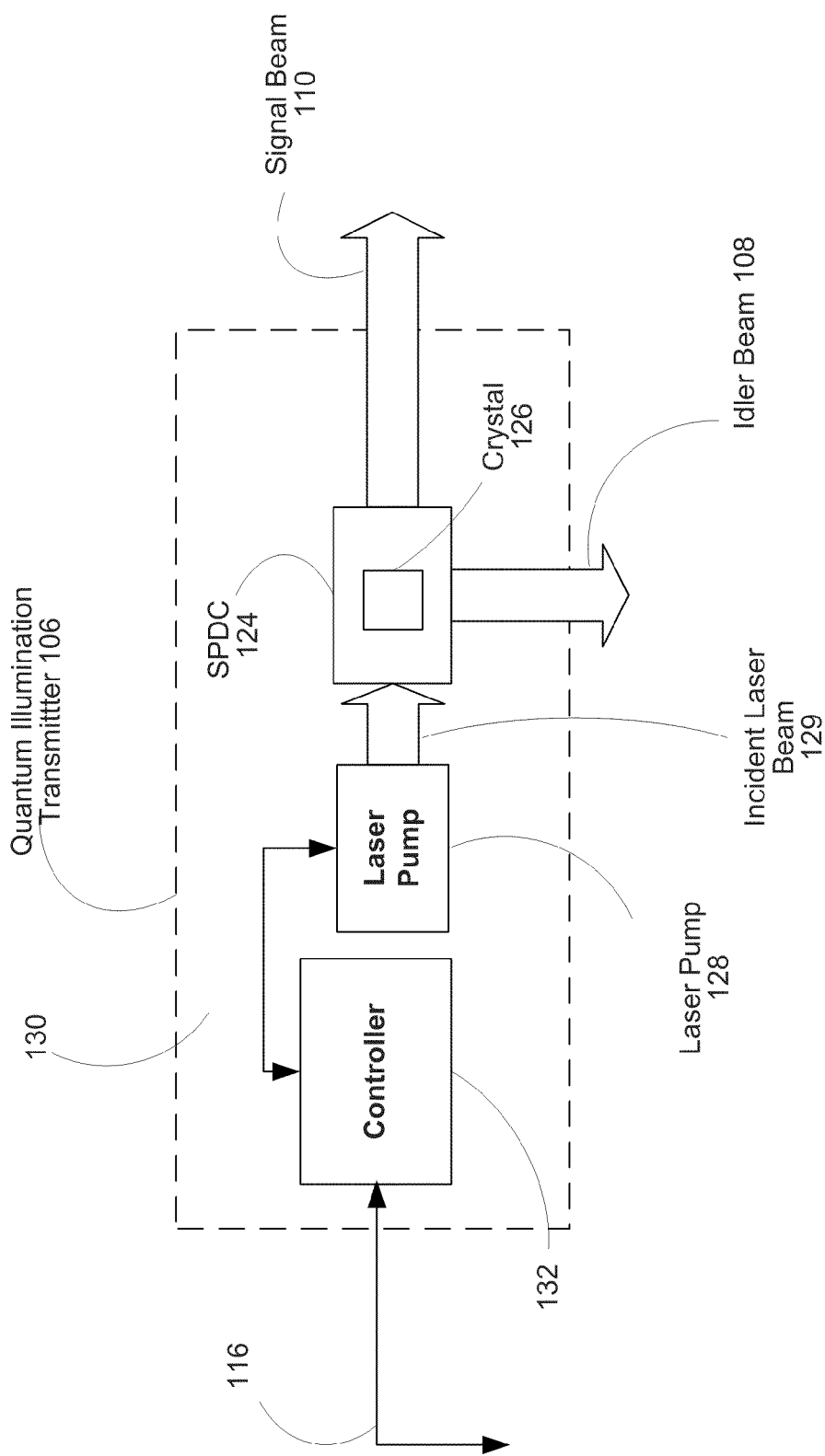
FIG. 1B is a block diagram of the transmitter in the target detection system of FIG. 1A, according to an illustrative embodiment.

FIG. 1B is a block diagram of the transmitter 106 in the target detection system 100 of FIG. 1A, according to an illustrative embodiment. In this embodiment, transmitter 106 includes a laser pump 128 and a spontaneous parametric downconverter (SPDC) 124. The laser pump 128 may be controlled by controller 132 via communication link 130. In turn, the controller 132 may be in communication with computer processor system 120 via communication link 116. The communication links 116 and 130 may be any suitable optical, electrical, or opto-electrical wired or wireless link.

SPDC 124 in transmitter 106 generates the signal beam 110 and the idler beam 108 using the incident laser beam 129 from the laser pump 128. In some embodiments, the SPDC 129 may emit photon pairs at a rate of about 1 million photons/second. This number of photons is also referred to as the mean photon number.

The signal and/or idler beams may comprise several different "modes." A mode corresponds to the spatial and temporal patterns or structure of an optical field. For instance, a laser may be emitting Gaussian modes in which the spatial optical intensity pattern of the wavefront may be described using a Gaussian function. Such a laser beam is referred to as a Gaussian beam. Each of the modes in a Gaussian beam have an associated wavelength or frequency. In addition, each of the photons in each of the modes of a Gaussian beam may have different polarizations. Polarization of a photon refers to the orientation of the photon with respect to the direction of photon travel. For instance, a photon in a Gaussian beam may have a circular, linear, or elliptical polarization with respect to the transverse axis of the laser beam. In some embodiments, the incident laser beam 129 includes a Gaussian beam with only two modes. Each of these two modes may correspond to a particular frequency or wavelength of photons that constitute the Gaussian beam.

SPDC 124 also includes a nonlinear crystal 126 which is used to perform spontaneous parametric downconversion. The nonlinear crystal 126 may be constructed from any suitable material, e.g., lithium niobate, lithium tantalate, potassium niobate, potassium titanyl phosphate, potassium dihydrogen phosphate, potassium dideuterium phosphate, lithium triborate, cesium lithium borate, cesium borate, yttrium calcium oxyborate, strontium beryllium borate, zinc germanium diphosphide, silver gallium sulfide, silver gallium selenide, cadmium selenide, silicon dioxide, gallium arsenide, or any combination thereof.

Spontaneous parametric downconversion refers to the process by which photons in each mode of the incident laser beam 129 from the laser pump 128 are split into pairs of photons by nonlinear crystal 126 such that the combined energy and momentum of each pair of photons equals the energy and momentum, respectively, of the originating photon. The nonlinear crystal 126 is passive and does not provide additional energy and/or momentum to the original photon. One photon in the pair of photons is used as a signal photon and the other photon is used as an idler photon. The signal-idler photon pair in each mode is quantum-mechanically entangled and is thus in a joint entangled state. The signal-idler photon pair thus created is quantum-mechanically entangled in terms of polarization. Thus, if the polarization of one photon in the pair is measured or determined, the polarization of the other photon in the pair is immediately ascertained as a result of the quantum-mechanical phenomenon of "wave-function collapse." In other embodiments, the signal-idler photon pairs may be entangled in frequency. In this manner, crystal 126 in SPDC 124 splits photons in the incident laser beam 129 to create signal beam 110 and idler beam 108. As described in reference to FIG. 1C or 1D, the entanglement of signal-idler photon pairs can be exploited to detect the presence or absence of target 102.

Figure 1C:
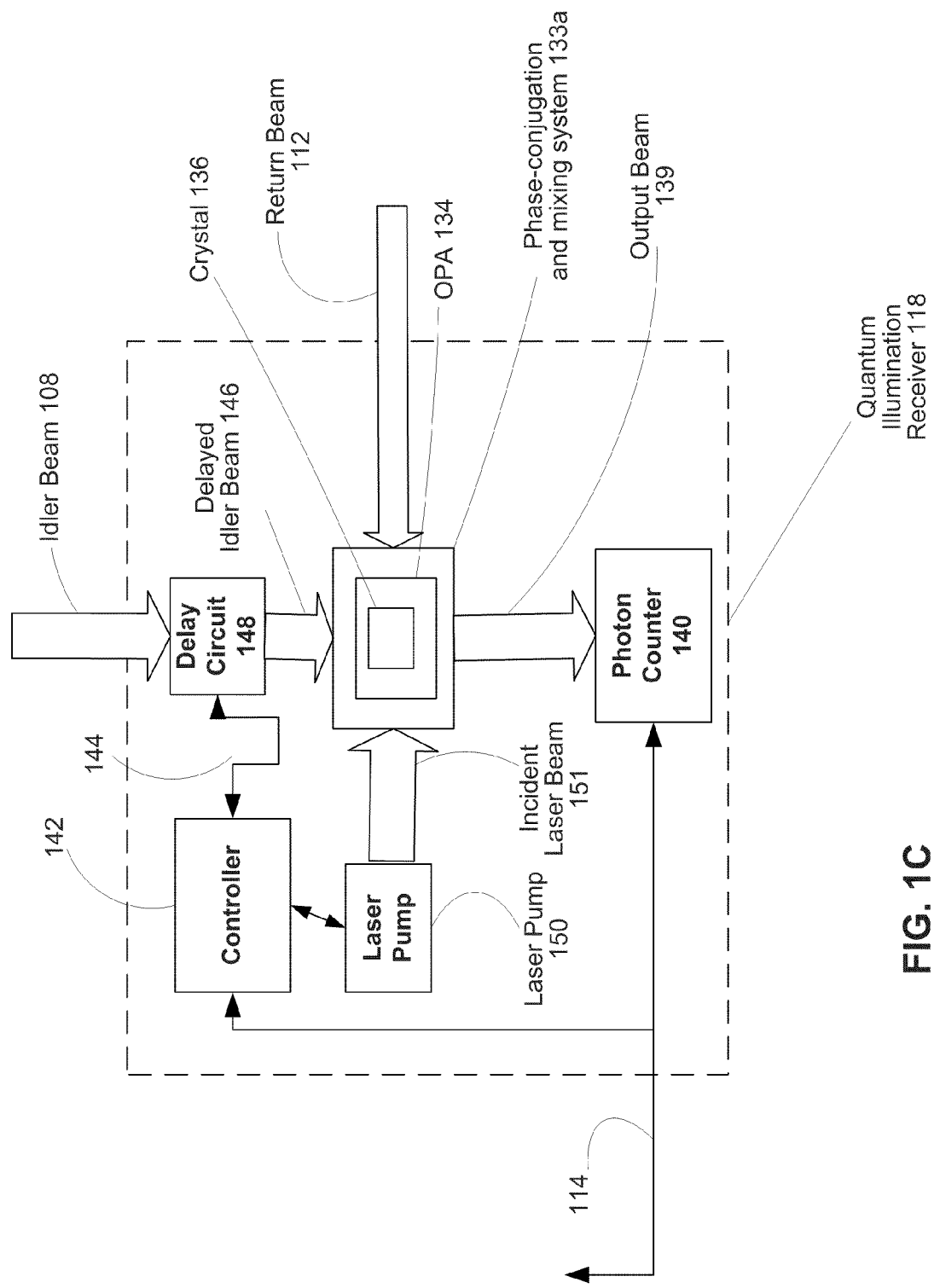
FIG. 1C is a block diagram of the receiver including a phase-conjugation and mixing system comprising an optical parametric amplifier in the target detection system of FIG. 1A, according to an illustrative embodiment.

FIG. 1C is a block diagram of the receiver 118 in the target detection system 100 of FIG. 1A, according to an illustrative embodiment. In this embodiment, receiver 118 includes a laser pump 150, a delay circuit 148, a phase-conjugation and mixing system 133a and a photon counter 140. In this embodiment, the phase-conjugation and mixing system 133a includes an optical parametric amplifier (OPA) 134. The delay circuit 148 or laser pump 150 may be controlled by a controller 142 via communication link 144. In turn, the controller 142 may be in communication with computer processor system 120 via communication link 114. The communication links 114 and 144 may be any suitable optical, electrical, or opto-electrical wired or wireless link.

The delay circuit 148 may be an optical delay circuit such as an optical cavity or switch-able fiber length. Optical cavities, for example, allow for an increase in the distance traveled by a laser beam, or the laser's path length, by employing effectively a series of mirrors to iteratively reflect the laser beam. Each reflection thus induced creates an additional length that the laser beam must travel.

OPA 134 in receiver 118 generates the output beam 139 using a delayed version 146 of the idler beam 108, the return beam 112, and the incident laser beam 151 from the laser pump 150. The return beam 112 includes noise from the target region, and may also include a reflected component of the signal beam that was used to interrogate the target region. The delayed version 146 is created by the delay circuit 148 which delays the idler beam 108 such that the return beam 112 and the delayed idler beam 146 are synchronized. These two beams need to be synchronized such that each mode of the delayed idler beam is matched with the corresponding mode of the return beam. This synchronization process ensures a more sensitive target detection process as discussed in more detail later in reference to FIGS. 2-5. The amount of delay in the delay circuit may be controlled by the controller 142, and in turn by the computer processor system 120 via link 114.

OPA 134 includes a nonlinear crystal 136 and has an associated amplifier gain G. Nonlinear crystal 136 may be constructed from a material selected to be lithium niobate, lithium tantalate, potassium niobate, potassium titanyl phosphate, potassium dihydrogen phosphate, potassium dideuterium phosphate, lithium triborate, cesium lithium borate, cesium borate, yttrium calcium oxyborate, strontium beryllium borate, zinc germanium diphosphide, silver gallium sulfide, silver gallium selenide, cadmium selenide, silicon dioxide, gallium arsenide, or any combination thereof. A publication titled "Receiver design to harness quantum illumination advantage," that was authored by one of the inventors in this application, published in the Proceedings of the IEEE International Symposium on Information Theory (ISIT 2009) on Jun. 28, 2009 to Jul. 3, 2009. This publication further describes aspects of one particular implementation of a phase-conjugation and mixing system suitable for use as phase-conjugation and mixing system 133a. The contents of this publication are hereby incorporated herein in their entirety. A publication by J. H. Shapiro titled "Defeating passive eavesdropping with quantum illumination," published in Phys. Rev. A 80, 022320 on Aug. 17, 2009. This publication describes the application of a system similar to the phase-conjugation and mixing system 133a to a secure communication system. The contents of this publication are hereby incorporated herein in their entirety.

Figure 1D:
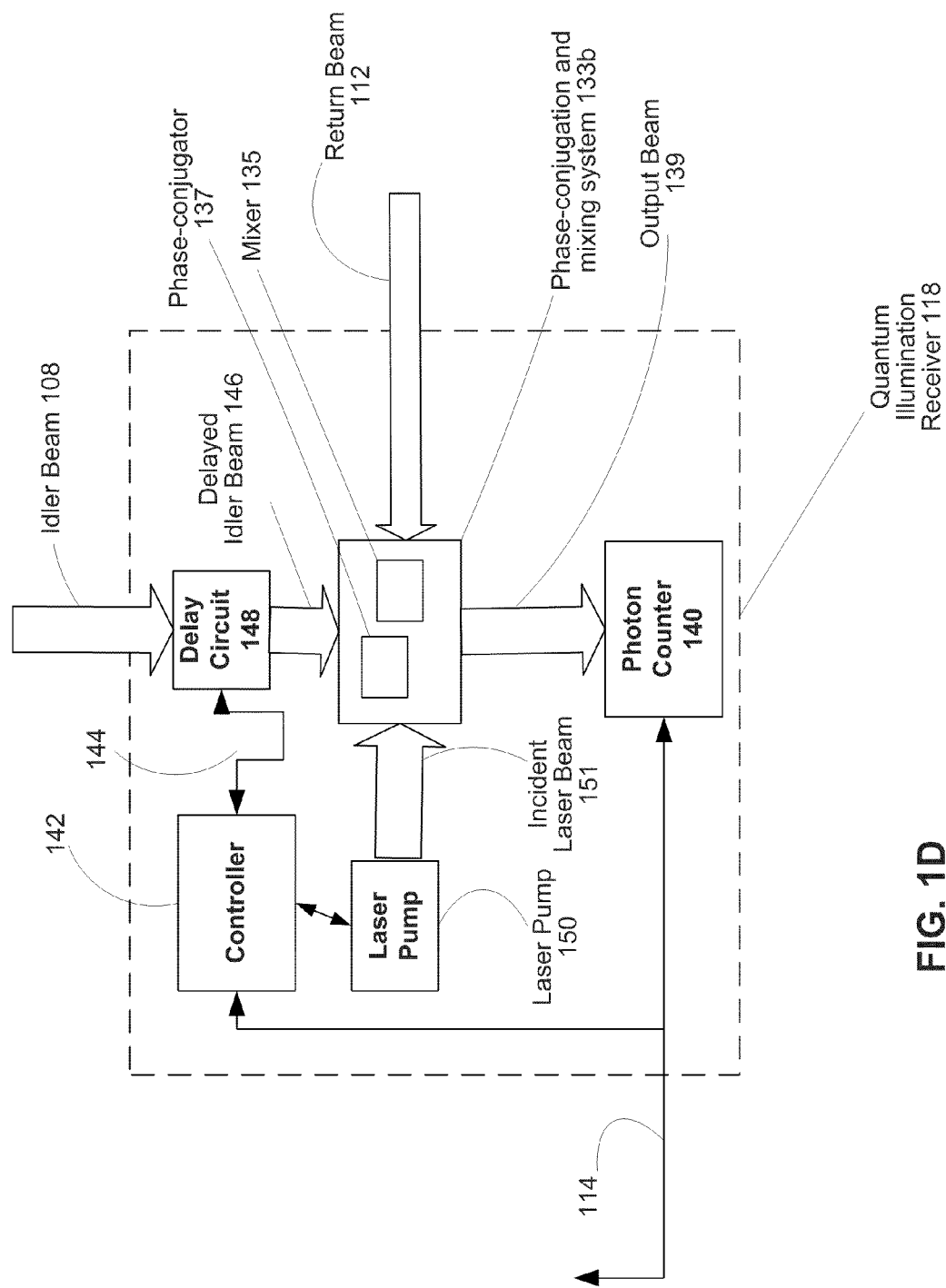
FIG. 1D is a block diagram of the receiver including a phase-conjugation and mixing system comprising a phase-conjugator and a mixer in the target detection system of FIG. 1A, according to an illustrative embodiment.

FIG. 1D is a block diagram of the receiver 118 in the target detection system 100 of FIG. 1A, according to a second illustrative embodiment. In this embodiment, receiver 118 includes a laser pump 150, a delay circuit 148, a phase-conjugation and mixing system 133b, and a photon counter 140. The phase-conjugation and mixing system 133b includes a mixer 135 and a phase-conjugator 137. In some embodiments, the phase-conjugator 137 is an optical parametric amplifier, similar to OPA 134 described above in relation to FIG. 1C. In some embodiments, the mixer 135 includes a 50-50 beam splitter. Mixer 135 may also include a unity-gain differential amplifier, or any other suitable amplifier. In other embodiments, phase-conjugator 137 may include a phase-conjugate mirror (not shown in FIG. 1D). The phase-conjugate mirror may also include an OPA such as OPA 134 described above in relation to FIG. 1C.

Phase-conjugation and mixing system 133b may process the return beam 112 and the delayed idler beam 146 to obtain a phase-conjugated return and idler beams. This processing may be performed using a mixer 135 in combination with a phase-conjugator 137. The resulting phase-conjugated and mixed return and idler beams may be input into a unity-gain differential amplifier to obtain an amplified and mixed phase-conjugated output beam 139. The resulting output beam 139 in this case is the algebraic sum of the mixed phase-conjugated return and idler beams. A publication titled "Gaussian-state quantum-illumination receivers for target detection," that was authored at least in part by one of the inventors in this application published on Oct. 8, 2009 in the Physical Review A journal. This publication further describes aspects of one particular implementation of a phase-conjugation and mixing system suitable for use as phase-conjugation and mixing system 133b. The contents of this publication are hereby incorporated herein in their entirety.

Photon counter 140 is used to process the output beam 139 of FIG. 1C or 1D as described in relation to FIGS. 2-4 below.

With continued reference to FIGS. 1C and 1D, in some embodiments, photon counter 140 may be a single-photon detector which counts the number of photons in each of the modes in the output beam 139. The mean count of the total number of photons across all the modes in output beam 139 will generally be larger if a target 102 is present in the interrogated target region 104 than if there is no target in the interrogated target region 104. The output of sensor 140 is transmitted to computer processor system 120 via link 114. As discussed in reference to FIGS. 2-5, the counted total number of photons across the modes of the output beam 139 may be used to determine the presence or absence of a target 102 in the target region 104 using a threshold detector.

Figure 1E:
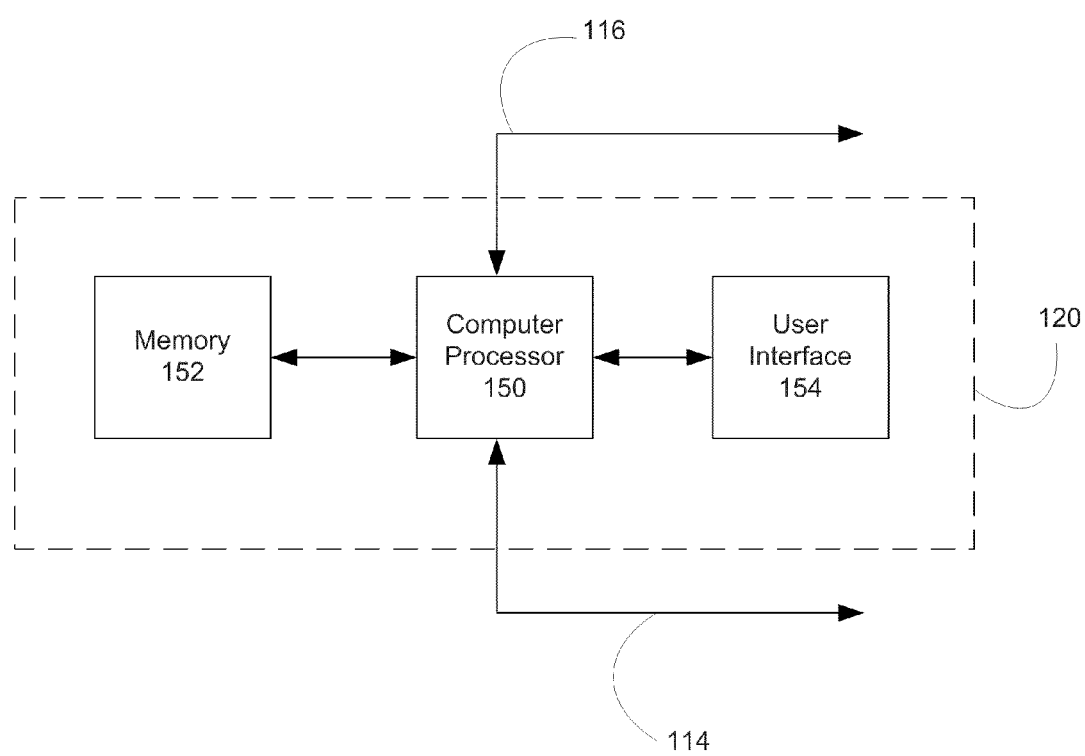
FIG. 1E is a block diagram of the computer processor system in the target detection system of FIG. 1A, according to an illustrative embodiment.

FIG. 1E is a block diagram of the computer processor system 120 in the target detection system 100 of FIG. 1A, according to an illustrative embodiment. System 120 includes a computer processor 150 in communication with a memory device 152 and a user interface 154. The system 120 communicates with transmitter 106 via communication link 116, and with receiver 118 via communication link 114.

The computer processor 150 may carry out any suitable computations and/or instructions. The instructions could be provided via a user interacting with user interface 154 and/or computer-executable instructions loaded into memory 152. For example, computer processor 150 may be used to control the delay in the delay circuit 148 in receiver 118, control components in the OPA 134 in receiver 118, or control components in the SPDC 124 in transmitter 106.

User interface 154 may include a display and/or user input devices such as a mouse, a keyboard, or a touch-screen panel. Each of the user input devices may be used to interact with the computer processor 150. For instance, a user may interact with the user interface to provide parameters and/or settings, e.g., a threshold for target detection, to computer processor 150 for the target detection process described later in relation to FIG. 2. The delay in the delay circuit 148 in receiver 118, for example, may be controlled by allowing a user to enter a distance d to the target region, after which computer processor 150 selects the delay that results in the much improved target-detection performance. In some embodiments, the user may select the delay itself. In other embodiments, the user may enter a range of distances to the target region, and the computer processor 150 may examine this range to select a delay that results in improved performance. Optionally, the user may provide a range of delays which computer processor 150 may use to determine a delay that results in improved target-detection performance.

The target detection process implemented in the system of FIGS. 1A-E will now be described in relation to FIGS. 2-5.

Figure 2:
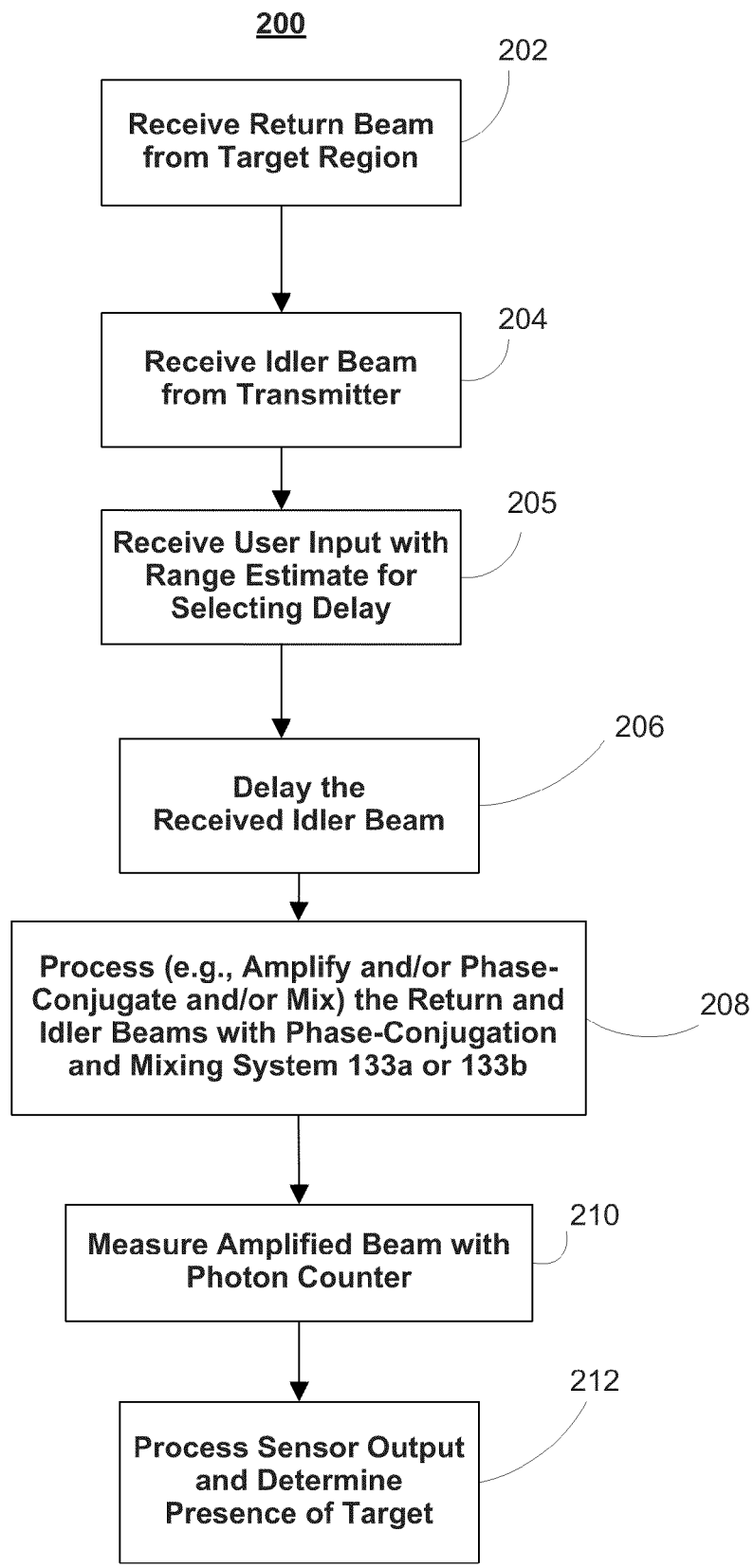
FIG. 2 is a process flow diagram of an exemplary target detection process, according to an illustrative embodiment.

FIG. 2 is a process flow diagram of an exemplary target detection process 200, according to an illustrative embodiment. Process 200 may be carried out by receiver 118 of FIGS. 1A, 1C, and 1D, in conjunction with computer processor system 120 of FIGS. 1A and 1E.

Figure 3:
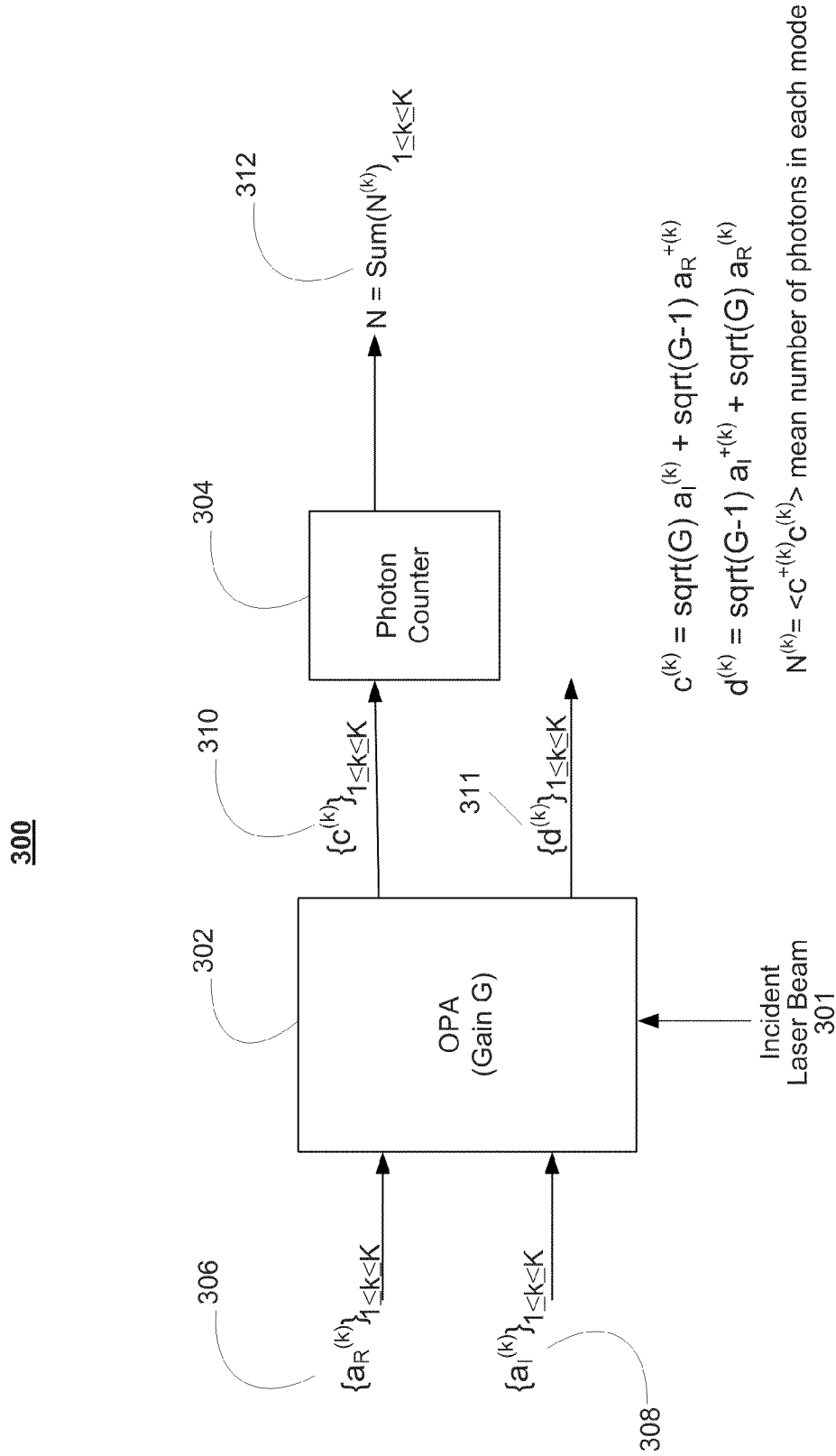
FIG. 3 is a schematic of the signal flow through the optical parametric amplifier of FIGS. 1A and 1C, according to an illustrative embodiment.

FIG. 3 is a schematic of the signal flow through OPA 302, an optical parametric amplifier similar to OPA 134 of FIGS. 1A, 1C, and 1D, according to an illustrative embodiment. This signal flow of signals 301, 306, 308, 310, 311, and 312 is an additional illustration of the operation of target detection process 208 and 210 of FIG. 2.

In the discussion that follows, it is assumed that the signal beam used to interrogate the target region includes a number $N_S$, of photons per mode on average. It is also assumed that there are K signal modes, each of which may be denoted $\{a_S^{(k)}\}$ where $1 \leq k \leq K$. The number of photons on average in the $k^{th}$ mode is denoted $<a_S^{+(k)}a_S^{(k)}>$. The entangled K idler beam modes may be denoted $\{a_I^{(k)}\}$ where $1 \leq k \leq K$. The number of photons on average in the $k^{th}$ mode of the idler beam is denoted $<a_I^{+(k)}a_I^{(k)}>$. The mean photon number in each of the signal and idler modes equals $N_S$. In this discussion, the joint signal-idler beam is assumed to be Gaussian. In other embodiments, the joint signal-idler beam may be generated deterministically, or may be non-Gaussian entangled light. It is also assumed that the target region is immersed in thermal noise with average photon number $N_B$ per mode, and that the transmissivity of the channel from the target region is the fraction κ. As test parameters for generating performance plots, it is assumed that $N_B=20$, $N_S=0.01$, κ=0.01, and that K is very large.

With continued reference to FIGS. 1A, 1C, 1D, 2, and 3, the quantum illumination receiver 118 receives return beam 112 with modes $\{a_R^{(k)}\}$ 306, where $1 \leq k \leq K$, from the target region 104 (step 202). The quantum illumination receiver 118 also receives the idler beam 108 with modes $\{a_I^{(k)}\}$ 308, where $1 \leq k \leq K$, from transmitter 106 (step 204). As the target may be located some distance away from the receiver, in order to enhance the detection process and ensure that the modes in the idler beam 108 and the modes in the return beam 112 are synchronized (e.g., frequency-matched). In some embodiments, a user input may be received with a range estimate for the target, and this range estimate information may be used to determine the appropriate delay for delay circuit 148 (step 205). Idler beam 108 is then delayed using delay circuit 148 to create a delayed idler beam 146 (step 206).

In some embodiments, the delayed idler beam 146 and the return beam 112 are then mixed and amplified by phase-conjugation and mixing system 133a, which includes an optical parametric amplifier 134 including a nonlinear crystal 136 and an associated amplifier gain G (step 208). In other embodiments, the delayed idler beam 146 and the return beam 112 are phase-conjugated, mixed, and amplified by phase-conjugation and mixing system 133b.

With continued reference to FIGS. 1C, 1D, 1E, 2, and 3, the output beam 139 with modes $\{c^{(k)}\}$ 310, where $1 \leq k \leq K$, generated by the phase-conjugation and mixing system 133a or 133b, is then measured by a photon counter, e.g., a single-photon detector 140. In some embodiments, OPA 134 may operate such that the modes of the output beam 139 are given by $c^{(k)} = \sqrt{G} a_I^{(k)} + \sqrt{G-1} a_R^{(k)}$ 310 and $d^{(k)} = \sqrt{G-1} a_I^{(k)} +  = \sqrt{G} a_R^{(k)}$ 311. In some embodiments, the gain G may be approximately 1. In other embodiments, phase-conjugation and mixing system 133a or 133b may operate such that the modes of the output beam 139 are given by any suitable expression involving $a_I(k)$, $a_R^{(k)}$, or phase-conjugated versions of $a_I^{(k)}$ and $a_R^{(k)}$ and a vacuum-state operator $a_V^{(k)}$. As described above, the phase-conjugation and mixing system 133b may be implemented using an OPA. In some embodiments, the gain of the OPA, G=2.

With reference to FIGS. 1A, 1C, 1D, 1E, 2, and 3, under the assumptions stated above, the average number of photons per mode of the output beam $\{c^{(k)}\}$ in the quantum illumination receiver 118 is different depending on whether a target 102 is present or absent in the target region 104.

While many target detection decision rules are possible, one suitable decision rule assumes that computer processor 150 must decide between two (binary) hypotheses $H_0$ and $H_1$. $H_0$ is the hypothesis that states that a target 102 is absent from the target region 104, while $H_1$ is the hypothesis that states that a target 102 is present in the target region 104.

In some embodiments, e.g., the embodiment of FIG. 1C, under hypothesis $H_0$, the mean photon number per mode of the output beam is given by $$N^{(k)} = <c^{+(k)}c^{(k)}> = GN_S + (G-1)(1+N_B) = N_0 \quad \text{(EQN. 1)}$$

and the mean photon count across all K modes in $KN_0$. Under hypothesis $H_1$, the mean photon number per mode of the output beam is given by:

$$N^{(k)} = <c^{+(k)}c^{(k)}> = GN_S + (G-1)(1+N_B+\kappa N_S) + \underbrace{2\sqrt{G(G-1)}\sqrt{\kappa N_S(N_S+1)}}_{\text{Cross-Correlation}} = N_1 \quad \text{(EQN. 2)}$$

and the mean photon count across all K modes in $KN_1$. The term labeled "cross-correlation" is representative of the remnant phase-sensitive cross-correlation between the return beam 112 and the delayed idler beam 146. This term would only appear when a quantum-illumination transmitter is used to interrogate the target region 104.

In other embodiments, e.g., the embodiment of FIG. 1D, under hypothesis $H_0$, the mean photon number per mode of the output beam is given by $$N^{(k)} = N_0 \quad \text{(EQN. 3)}$$

and the mean photon count across all K modes in $KN_0$. Under hypothesis $H_1$, the mean photon number per mode of the output beam is given by:

$$N^{(k)} = \underbrace{2\sqrt{\kappa N_S(N_S+1)}}_{\text{Cross-Correlation}} = N_1 \quad \text{(EQN. 4)}$$

and the mean photon count across all K modes in $KN_1$. The term labeled cross-correlation in EQN. 4 is representative of the remnant phase-sensitive cross-correlation between the phase-conjugated return beam 112 and the phase-conjugated delayed idler beam 146. Again, this term would only appear when a quantum-illumination transmitter is used to interrogate the target region 104.

The photon counter 304, which in some embodiments may be a single-photon detector, counts the total number of photons or "clicks"

$$N = \sum_{k=1}^{K} N^{(k)}$$

312 present in the K modes of the output beam 139 received by the photon counter 304 (step 210). This number of photons N 312 is then processed by the computer processor system 120 to determine the presence or absence of a target 102 (step 212) as described below.

For the embodiment of FIG. 1C, under the hypotheses $H_0$ and $H_1$, the conditional probability mass functions of the total number of photons counted across all K modes, N are given by $$p_{N|H_0}(n \mid H_0) = \frac{1}{(1+N_0)^K}\binom{n+K+1}{n}\left(\frac{N_0}{1+N_0}\right)^n \quad \text{(EQN. 5)}$$

and $$p_{N|H_1}(n \mid H_1) = \frac{1}{(1+N_1)^K}\binom{n+K+1}{n}\left(\frac{N_1}{1+N_1}\right)^n \quad \text{(EQN. 6)}$$

respectively. These conditional distributions tend to Gaussian distributions with means $KN_0$ and $KN_1$ respectively in the limit of large values of K, due to the Central Limit Theorem (CLT).

Figure 4:
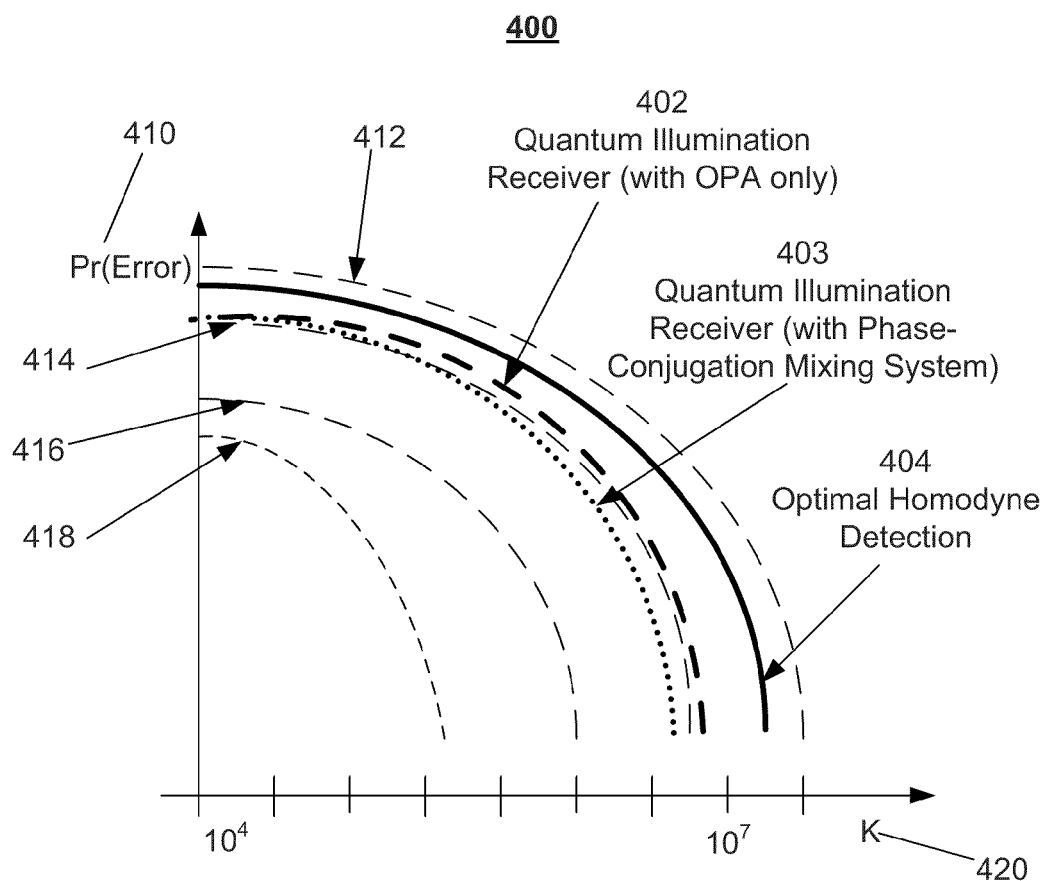
FIG. 4 illustrates a set of probability-of-error curves representative of the error-probability performance as a function of the number of received modes achieved by the quantum-illumination receiver, according to an illustrative embodiment.

FIG. 4 is a performance graph 400 showing the error probability performance of the quantum illumination receiver 118 of FIGS. 1A, 1C, and 1D, according to an illustrative embodiment.

Graph 400 in FIG. 4 shows the theoretical error probability Pr(Error) on the y-axis 410 versus the number of modes K in the measured output beam on the x-axis 420. The theoretical error probability for quantum illumination receivers is generally dependent, for example, upon the mean number of photons per mode in the signal $N_S$, the mean number of photons per mode in the thermal noise $N_B$, the modal transmissivity of the return communication channel κ, the gain of the OPA G, and the number of modes K. In graph 400, it is assumed that κ=0.01, G=1+5×10E-4, $N_S$=0.01 and $N_B$=20.

Using a coherent laser transmitter, the theoretical error bounds (the upper bound 412 is the Chernoff bound, while the lower bound 414 is based on the Bhattacharya bound) for detection are illustrated with lines 430. Using a quantum illumination transmitter, the theoretical error bounds (the upper bound 416 is the Chernoff bound, while the lower bound 418 is based on the Bhattacharya bound) for target detection are illustrated with lines 430. For optimal homodyne detection with coherent light, the error probability is shown by line 404. For the quantum illumination receiver using phase-conjugation and mixing system 133a with OPA 134 as described above in relation to FIG. 1C, the error probability is shown by line 402. For the quantum illumination receiver with phase-conjugation and mixing system 133b using an OPA as the phase conjugator 137, and a 50-50 beam splitter and unity-gain differential amplifier as the mixer 135, the error probability is shown by line 403.

The error probability for the quantum illumination-based systems, such as system 100 in FIG. 1A, which employs the detection processes described in FIGS. 2-5 is, in fact, exactly 3 dB better than the error probability for the optimally-designed classical laser-radar based system in the limit of high loss (κ≪1), high noise ($N_B$≫1), and weak signal strength ($N_S$≪1). The theoretical maximum performance gain that a well-designed quantum illumination receiver can achieve over the optimally-designed classical laser-radar based system is 6 dB as described in "Quantum Illumination with Gaussian States," Phys. Rev. Lett. 101, 253601 (2008).

Figure 5:
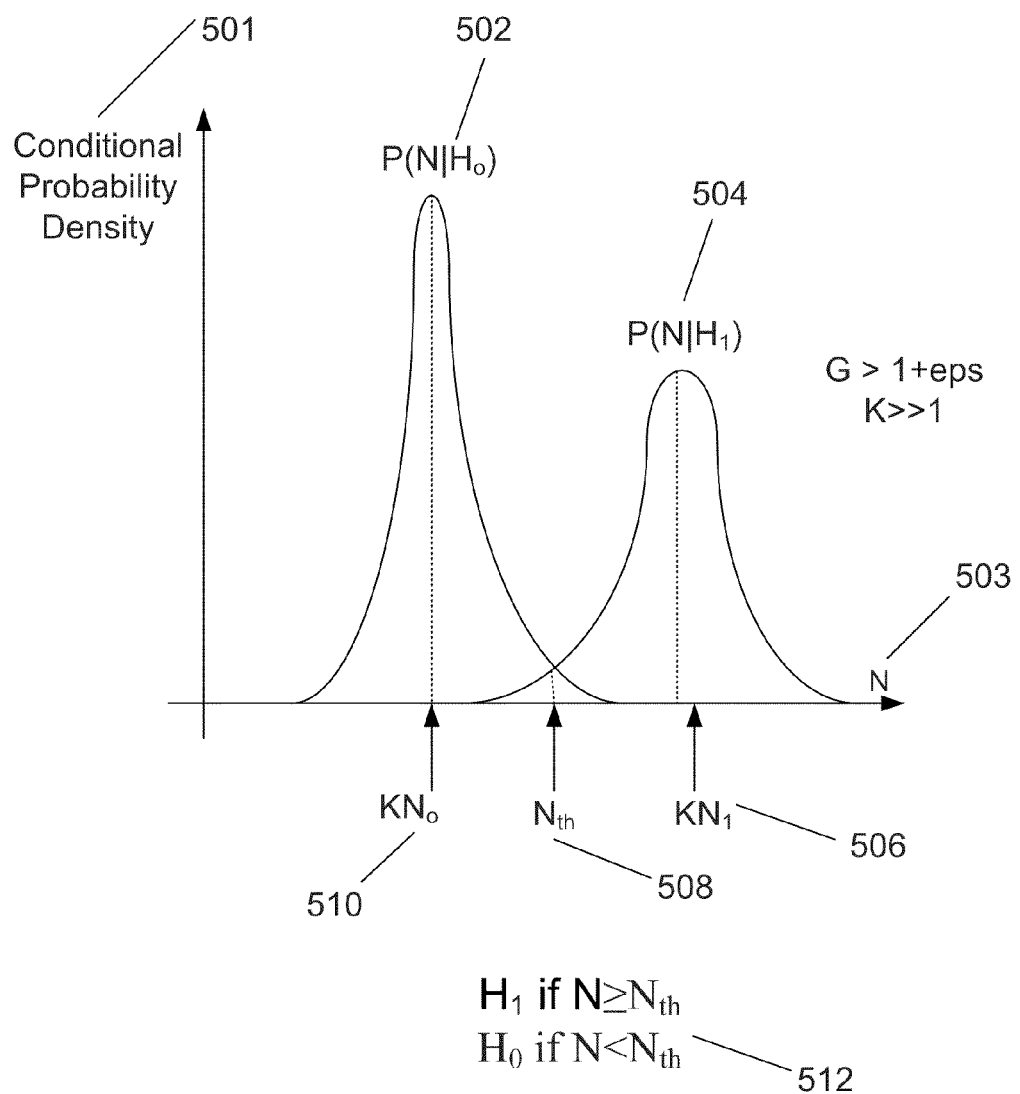
FIG. 5 illustrates a pair of conditional probability densities which may be used by the quantum illumination receiver, according to an illustrative embodiment.

FIG. 5 illustrates a pair of probability distributions 502 and 504 representative of the conditional distributions in Equations 3 (or 5) and 4 (or 6), respectively. Probability distributions 502 and 504 may be used by quantum illumination receiver 118 of FIGS. 1A, 1C, and 1D for detecting targets, according to an illustrative embodiment. The y-axis 501 depicts conditional probability density while the x-axis 503 depicts the total number of photons or clicks N. The mean of the Gaussian distribution 502 is $KN_0$ 510, while the mean of the Gaussian distribution 504 is $KN_1$ 506. The point of intersection 508 of the two conditional probability distributions occurs at $N_{th}$ or $N_{threshold}$. This value of N is the decision threshold for decision rule 512. For optimal detection under binary hypotheses $H_0$ and $H_1$, $N \geq N_{th}$ indicates the presence of a target, while $N < N_{th}$ indicates that no target is present. The area of the probability distributions 502 and 504 close to $N_{th}$ indicate the potential for error, namely detecting a target when no target is present and not detecting a target when one is present. This threshold $N_{th}$ can be selected by a user interacting with user interface 154 of computer processor system 120 as described above in relation to FIG. 1E.

The invention may be embodied in other specific forms without departing from the spirit or essential characteristics thereof. For instance, the methods and systems described herein may be employed in any optical, electrical, or electro-optical system, without limitation. The forgoing embodiments are therefore to be considered in all respects illustrative, rather than limiting of the invention. For instance, while embodiments have been described with relation to target detection, such embodiments may also be used for range estimation, imaging and/or other optical sensing applications including, but not limited to, high-precision microscopy, lithography and metrology.

What is claimed is:

1. A quantum illumination receiver for interrogating a target region comprising:
    a phase-conjugation and mixing system for outputting an output beam representative of the contents of the target region;
    a beam collector for receiving a return beam from the target region and directing the return beam to the phase-conjugation and mixing system;
    an optical input for receiving an idler beam from a transmitter and directing the idler beam from the transmitter to the phase-conjugation and mixing system, wherein the idler beam is quantum-mechanically entangled with a signal beam interrogating the target region;
    a sensor for measuring the output of the phase-conjugation and mixing system; and
    a processor in communication with the receiver configured to process the output of the sensor to detect the presence of a target in the target region.

2. The receiver of claim 1, wherein the sensor includes a photon counter.

3. The receiver of claim 2, wherein the photon counter is a single-photon detector.

4. The receiver of claim 3, wherein the single-photon detector is used to detect greater than 1,000,000 modes.

5. The receiver of claim 1, wherein the phase-conjugation and mixing system includes an optical parametric amplifier (OPA).

6. The receiver of claim 5, wherein the phase-conjugation and mixing system includes a laser pump for directing a laser beam into the OPA to amplify the received return and idler beams.

7. The receiver of claim 1, wherein the phase-conjugation and mixing system includes a nonlinear crystal that is constructed from a material selected from the group comprising lithium niobate, lithium tantalate, potassium niobate, potassium titanyl phosphate, potassium dihydrogen phosphate, potassium dideuterium phosphate, lithium triborate, cesium lithium borate, cesium borate, yttrium calcium oxyborate, strontium beryllium borate, zinc germanium diphosphide, silver gallium sulfide, silver gallium selenide, cadmium selenide, silicon dioxide, and gallium arsenide.

8. The receiver of claim 1, wherein the processor is further configured to control a delay of the received idler beam based on a distance to the target region, wherein the delay is provided by a delay circuit.

9. The receiver of claim 8, further comprising:
    a user interface for selecting the distance to the target region.

10. A method for interrogating a target region comprising:
    receiving a return beam from the target region and directing the received return beam to a phase-conjugation and mixing system;
    receiving an idler beam from a transmitter and directing the received idler beam to the phase-conjugation and mixing system, wherein the idler beam is quantum-mechanically entangled with a signal beam interrogating the target region;
    measuring an output of the phase-conjugation and mixing system using a sensor, the phase-conjugation and mixing system output being representative of the contents of the target region; and
    processing an output of the sensor to detect the presence of a target in the target region.

11. The method of claim 10, wherein the sensor includes a photon counter.

12. The method of claim 11, wherein the photon counter is a single-photon detector.

13. The method of claim 12, wherein the single-photon detector is used to detect greater than 1,000,000 modes.

14. The method of claim 10, wherein the phase-conjugation and mixing system includes an optical parametric amplifier (OPA).

15. The method of claim 10, further comprising amplifying the received return and idler beams by directing a laser beam from a laser pump into the phase-conjugation and mixing system.

16. The method of claim 10, wherein the phase-conjugation and mixing system includes a nonlinear crystal that is constructed from a material selected from the group comprising lithium niobate, lithium tantalate, potassium niobate, potassium titanyl phosphate, potassium dihydrogen phosphate, potassium dideuterium phosphate, lithium triborate, cesium lithium borate, cesium borate, yttrium calcium oxyborate, strontium beryllium borate, zinc germanium diphosphide, silver gallium sulfide, silver gallium selenide, cadmium selenide, silicon dioxide, and gallium arsenide.

17. The method of claim 10, further comprising
    controlling a delay of the received idler beam based on a distance to the target region, wherein the delay is provided by a delay circuit.

18. The method of claim 17, further comprising:
    receiving a user input for selecting the distance to the target region.

* * * * *